(12) United States Patent
Vargantwar et al.

(10) Patent No.: US 8,306,008 B1
(45) Date of Patent: Nov. 6, 2012

(54) CODE PROCESSING DISTRIBUTION IN A CODE DIVISION MULTIPLEXING COMMUNICATION SYSTEM

(75) Inventors: Sachin R. Vargantwar, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 289 days.

(21) Appl. No.: 12/840,956

(22) Filed: Jul. 21, 2010

(51) Int. Cl.
*H04B 7/216* (2006.01)
*H04L 12/26* (2006.01)

(52) U.S. Cl. .................. 370/342; 370/252; 370/335

(58) Field of Classification Search .................. None
See application file for complete search history.

(56) References Cited

U.S. PATENT DOCUMENTS

| | | | |
|---|---|---|---|
| 5,515,369 A | 5/1996 | Flammer, III et al. | |
| 6,647,053 B1 | 11/2003 | Garces | |
| 7,200,124 B2 * | 4/2007 | Kim et al. | 370/324 |
| 7,420,946 B2 * | 9/2008 | Kim et al. | 370/335 |

* cited by examiner

*Primary Examiner* — Clemence Han

(57) ABSTRACT

In a communication system, a first base station transceiver receives first wireless signals in a code division multiplex format using a first code assigned to the first transceiver. The first transceiver determines a first noise indicator corresponding to the reception of the wireless signals and transfers the first noise indicator. A second base station transceiver receives second wireless signals in the code division multiplex format using a second code assigned to the second transceiver. The second transceiver determines a second noise indicator corresponding to the reception of the wireless signals. The second transceiver receives the first noise indicator. The second transceiver processes the first and second noise indicators to determine if it should receive third wireless signals using the first code assigned to the first transceiver. If so, the second transceiver receives the third wireless signals using the first code assigned to the first transceiver.

20 Claims, 7 Drawing Sheets

CODE PROCESSING DISTRIBUTION IN A CODE DIVISION MULTIPLEXING COMMUNICATION SYSTEM

TECHNICAL BACKGROUND

Wireless communication systems use code division multiplexing to separate wireless communications exchanged between various base station transceivers and wireless communication user devices. In a code division multiplexing system, base station transceivers and users are each assigned codes. Examples of the codes include long codes, short codes, and Walsh codes. The base station transceivers wirelessly broadcast signals that are processed to derive these codes.

A given wireless user device selects a base station transceiver for service—typically based on a transceiver list and comparative signal strength—and determines the applicable codes for the selected a base station transceiver. The wireless user device then logically combines its communication with the codes for the selected base station transceiver for wireless transmission. The selected base station transceiver uses these codes to separate this communication from the communications of other users and from the communications intended for different base station transceivers.

OVERVIEW

In a communication system, a first base station transceiver receives first wireless signals in a code division multiplex format using a first code assigned to the first transceiver. The first base station transceiver determines a first noise indicator corresponding to the reception of the first wireless signals and transfers the first noise indicator. A second base station transceiver receives second wireless signals in the code division multiplex format using a second code assigned to the second base station transceiver. The second base station transceiver determines a second noise indicator corresponding to the reception of the second wireless signals. The second base station transceiver also receives the first noise indicator. The second base station transceiver processes the first noise indicator and the second noise indicator to determine if it should receive third wireless signals using the first code assigned to the first base station transceiver. If so, the second transceiver receives the third wireless signals using the first code assigned to the first base station transceiver.

DETAILED DESCRIPTION

Figure 1:
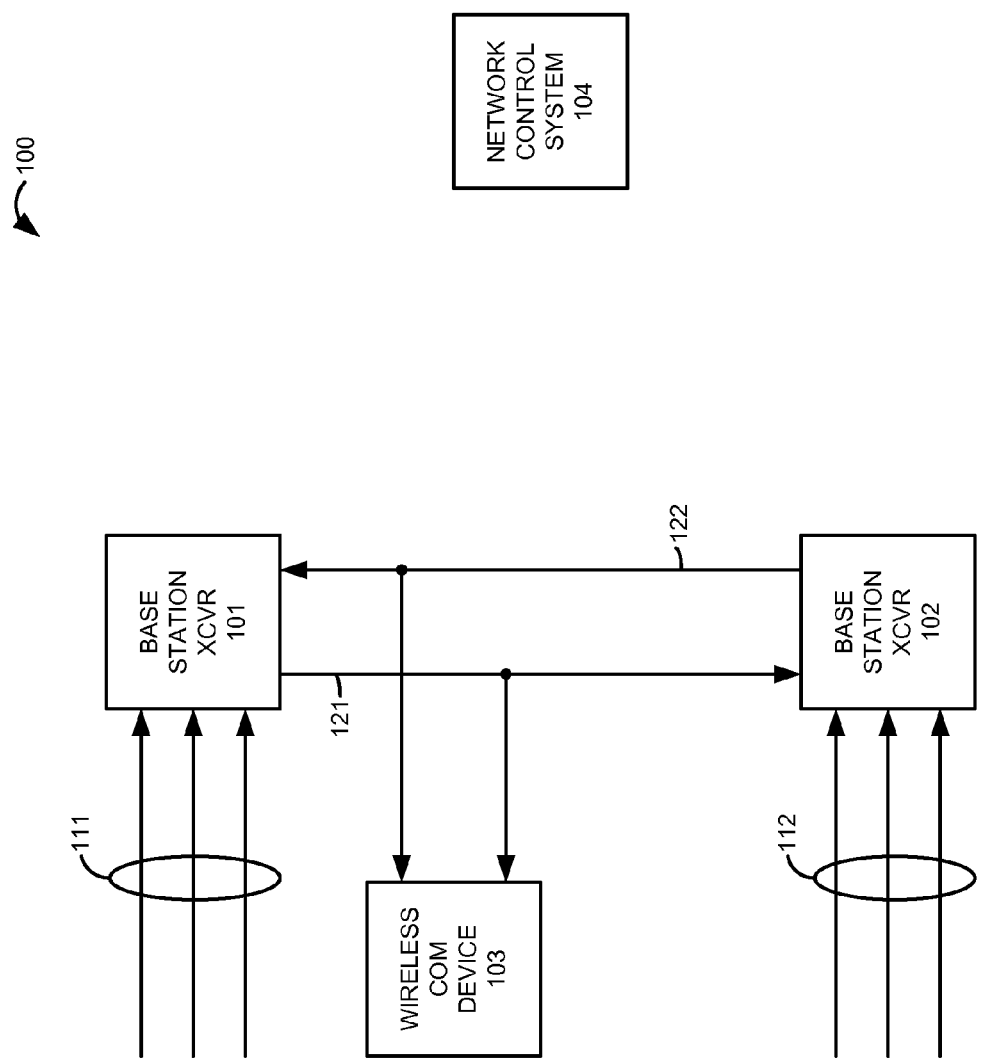
FIG. 1 illustrates a code division multiplexing communication system that distributes code processing.

FIG. 1 illustrates code division multiplexing communication system 100. Code division multiplexing communication system 100 comprises base station transceivers 101-102, wireless communication device 103, and network control system 104. Base station transceivers 101-102 comprise network equipment, such as antennas, filters, amplifiers, and signal processing circuitry and software. Wireless communication device 103 comprises user equipment, such as a computer, telephone, camera, media player, e-book, internet appliance, or data storage device. Network control system 104 comprises a computer and communication system, such as a wireless network gateway, mobile switching system, or base station controller.

In the code division multiplexing format, a first code is assigned to base station transceiver 101, and a second code is assigned to base station transceiver 102. Wireless signals 111 are encoded using the first code, and base station transceiver 101 uses the first code to receive wireless signals 111 and ignore wireless signals 112. Wireless signals 112 are encoded using the second code, and base station transceiver 102 use the second code to receive wireless signals 112 and ignore wireless signals 111. Note that the different codes allow the network to maintain logical separation between the different streams of traffic.

Base station transceiver 101 determines noise indicator 121 corresponding to the reception of the wireless signals 111. Base station transceiver 102 determines noise indicator 122 corresponding to the reception of the wireless signals 112. For example, base station transceivers 101-102 may measure and calculate a reverse noise ratio, signal-to-noise ratio, or some other noise metric during wireless signal reception. Base station transceivers 101-102 wirelessly broadcast their respective noise indicators 121-122. Base station transceiver 102 receives noise indicator 121 from base station transceiver 101, and base station transceiver 101 receives noise indicator 122 from base station transceiver 102.

Base station transceiver 102 processes noise indicators 121-122 to determine if transceiver 102 should receive wireless signals using the first code that is assigned to transceiver 101. For example, if noise indicator 121 for transceiver 101 exceeds a first threshold while its own noise indicator 122 is below a second threshold, then base station transceiver 102 determines that it should use the first code for transceiver 101 to receive wireless signals. Thus, the processing of the first code will be distributed across base station transceivers 101-102.

Wireless communication device 103 selects base station transceiver 101 as its primary access point for wireless communication service—typically based on a transceiver list and comparative signal strength. Wireless communication device 103 also identifies base station transceiver 102 as a potential secondary access point—typically based on the transceiver list and comparative signal strength. Wireless communication device 103 receives noise indicators 121-122 responsive to these selections.

Figure 2:
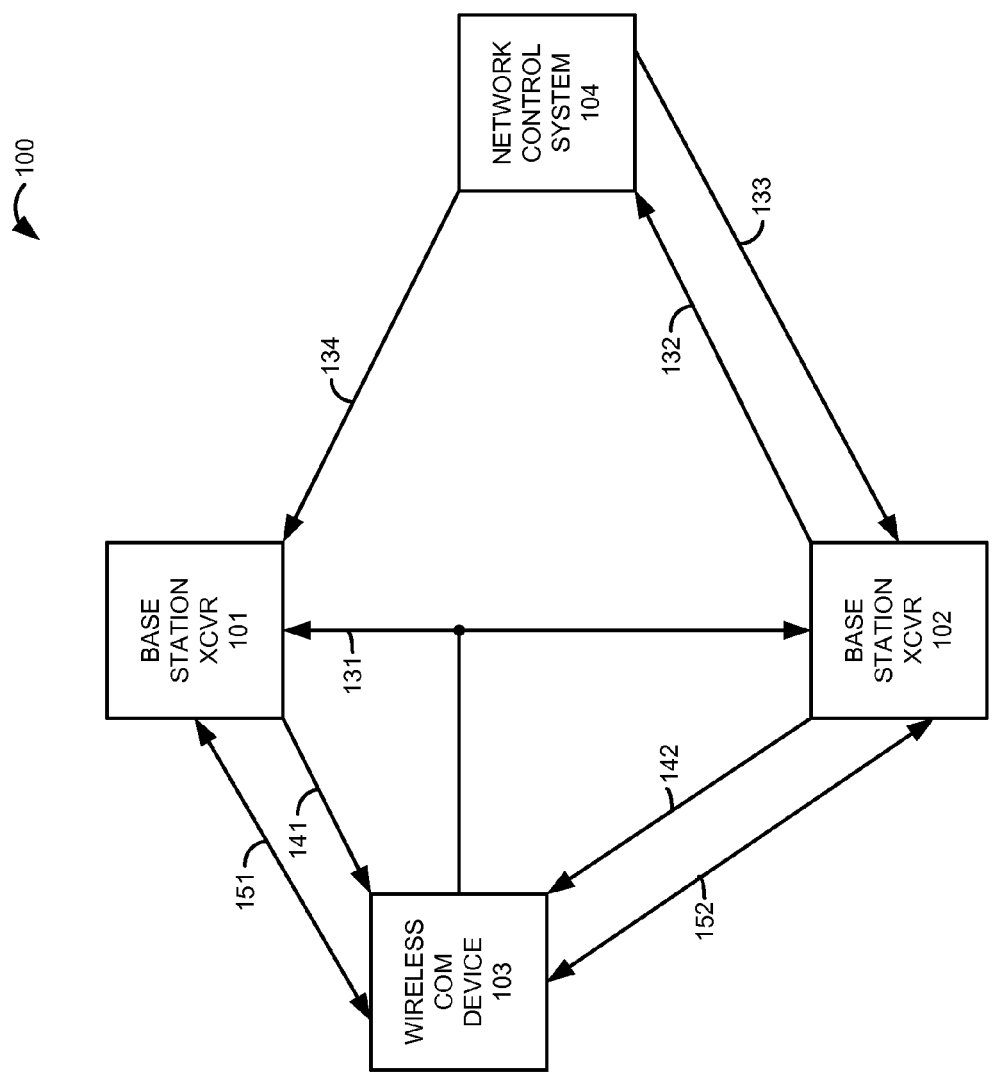
FIG. 2 illustrates a code division multiplexing communication system that distributes code processing.

FIG. 2 further illustrates code division multiplexing communication system 100. In response to the primary transceiver selection, wireless communication device 103 transfers service request 131 using the first code assigned to base station transceiver 101. In addition, wireless communication device 103 wirelessly monitors paging channel 141 from base station transceiver 101. Base station transceiver 101 will attempt to receive service request 131 using its assigned first code. As discussed above, base station transceiver 102 is also using the first code to receive service request 131 in response to the noise condition (noise indicators 121-122).

Wireless communication device 103 processes noise indicators 121-122 to determine if device 103 should also monitor paging channel 142 from the secondary base station transceiver 102. For example, if noise indicator 121 for base station transceiver 101 exceeds the first threshold while noise indicator 142 for base station transceiver 102 is below the second threshold, then wireless communication device 103 determines that it should also monitor paging channel 142 from base station transceiver 102.

Consider a scenario where base station transceiver 101 is experiencing high noise, but base station transceiver 102 is experiencing low noise. In this particular noise condition, base station transceiver 102 uses the first code assigned to base station transceiver 101 to receive service request 131 that was actually intended for base station transceiver 101. In addition, wireless communication device 103 monitors paging channel 142 from the base station transceiver 102 (in addition to paging channel 141). Thus, the particular noise condition causes base station transceiver 102 and wireless communication device 103 to implement an alternative access point to avoid the high noise condition at base station transceiver 101.

In response to service request 131, base station transceiver 102 transfers corresponding service request 132 to network control system 104. Note that base station transceiver 101 may also receive service request 131 and transfer a corresponding service request to network control system 104, although the noise condition may prevent this from happening. In response to service request 132, network control system 104 determines that a request for base station transceiver 101 has been received and processed by base station transceiver 102. Network control system 103 selects one of transceivers 101-102 to provide the requested communication service. This selection could be based on comparative loading, noise levels, signal strength, or some other logic and metrics.

In a first illustrative example, network control system 104 selects base station transceiver 102 to provide the requested communication service. Network control system 104 transfers instruction 133 to base station transceiver 102 to provide the requested communication service to wireless communication device 103. Network control system 104 also transfers instruction 134 to base station transceiver 101 not to provide the requested communication service to wireless communication device 103, although instruction 134 could be omitted if base station transceiver 101 did not report any service request for wireless communication device 103.

Base station transceiver 102 receives instruction 133, and in response, transceiver 102 communicates with wireless communication device 103 over paging channel 142. Responsive to the noise condition, wireless communication device 103 is monitoring paging channel 142, so wireless communication device 103 is ready to receive the communication. Base station transceiver 102 and wireless communication device 103 then exchange wireless signals 152 to implement the requested communication service.

In a second illustrative example, network control system 104 selects base station transceiver 101 to provide the requested communication service. Network control system 104 transfers instruction 133 to base station transceiver 102 not to provide the requested communication service to wireless communication device 103. Network control system 104 also transfers instruction 134 to base station transceiver 101 to provide the requested communication service to wireless communication device 103—even though transceiver 101 may not have received service request 131.

Base station transceiver 101 receives instruction 134, and in response, transceiver 101 communicates with wireless communication device 103 over paging channel 141. Based its initial transceiver selection, wireless communication device 103 is monitoring paging channel 141, so wireless communication device 103 is ready to receive the communication. Base station transceiver 101 and wireless communication device 103 then exchange wireless signals 151 to implement the requested communication service.

Figure 3:
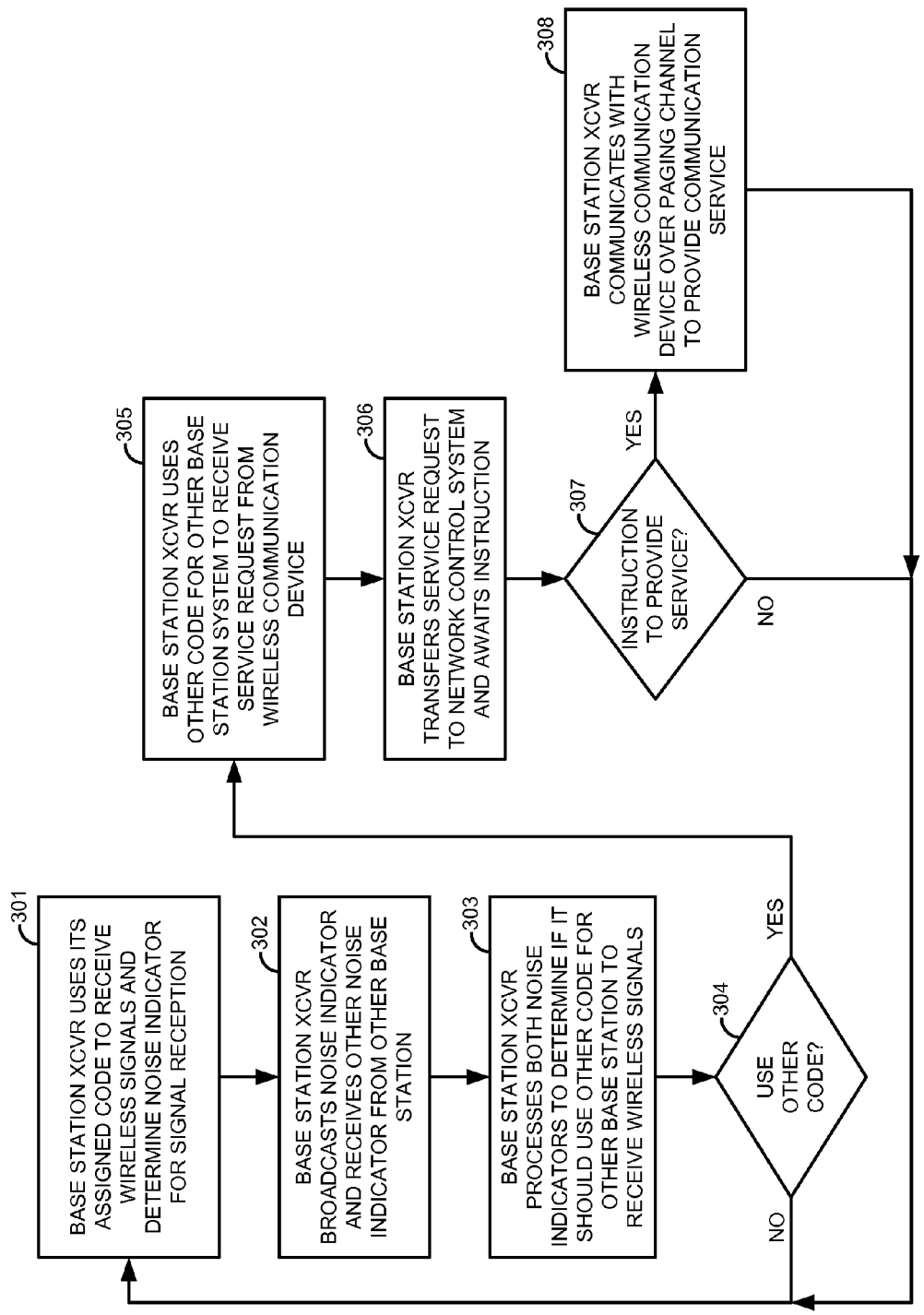
FIG. 3 illustrates the operation of a base station transceiver to distribute code processing.

FIG. 3 illustrates the operation of base station transceiver 102. The operation of base station transceiver 101 would be similar. Base station transceiver 102 receives wireless signals 112 with a second code and determines noise indicator 122 for the wireless signal reception (301). Base station transceiver 102 wirelessly broadcasts noise indicator 122 and receives noise indicator 121 from base station transceiver 101 (302). Base station transceiver 102 processes noise indicators 121-122 to determine if transceiver 102 should use the first code for transceiver 101 to receive wireless signals (303), and if so (304), base station transceiver 102 uses the first code to receive a service request from wireless communication device 103 (305). Note that base station transceiver 102 typically continues to use its own second code to receive other service requests from other wireless communication devices. Thus, base station transceiver re-allocates a portion of its code-processing circuitry to use the first code, while the remaining code-processing circuitry continues to use the second code.

Base station transceiver 102 transfers corresponding service request 132 to network control system 104 and awaits an instruction (306). If base station transceiver 102 receives instruction 133 to provide the requested service (307), then transceiver 102 communicates with wireless communication device 103 over paging channel 142 to provide the requested communication service (308).

Figure 4:
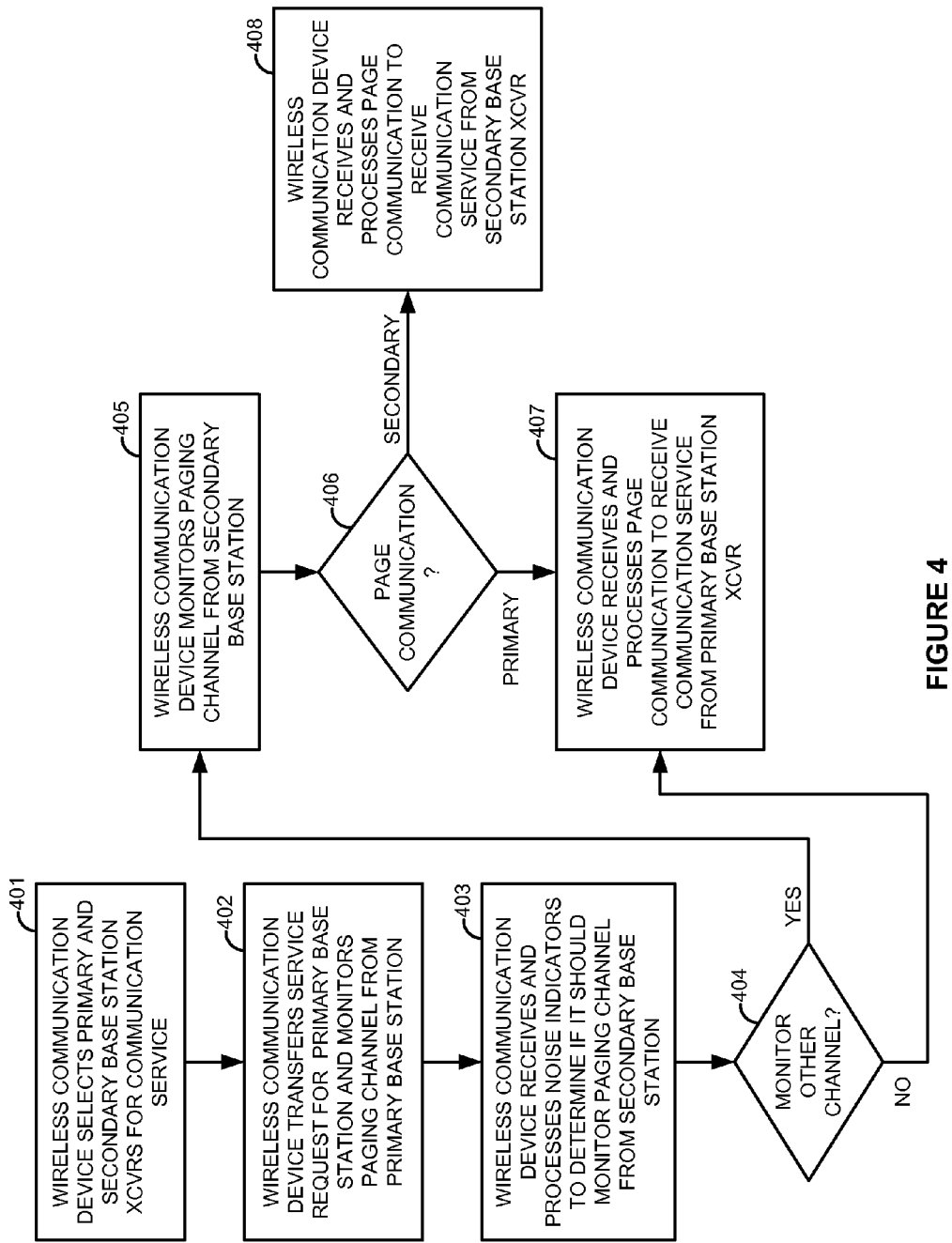
FIG. 4 illustrates the operation of a wireless communication device to distribute code processing.

FIG. 4 illustrates the operation of wireless communication device 103. Wireless communication device 103 selects base station transceiver 101 as the primary access point for the wireless communication service and selects base station transceiver 102 as the secondary access point (401). Wireless communication device 103 transfers service request 131 to primary base station transceiver 101 using the first code and monitors paging channel 141 from base station transceiver 101 (402).

Wireless communication device 103 also receives and processes noise indicators 121-122 from base station transceivers 101-102 to determine if device 103 should wirelessly monitor paging channel 142 from secondary base station transceiver 102 (403), and if so (404), device 103 wirelessly monitors paging channel 142 (405). If wireless communication device 103 receives a communication over paging channel 141 from primary transceiver 101 (406), then device 103 processes the communication to receive the requested communication service from primary base station transceiver 101 (407). If wireless communication device 103 receives a communication over secondary paging channel 142 (406), then device 103 processes the communication to receive the requested communication service from secondary base station transceiver 102 (408).

Note that the transfer of the service request and the processing of the noise indicators is illustrated above in a sequential manner, but these operations may occur in a different sequence or occur contemporaneously.

Figure 5:
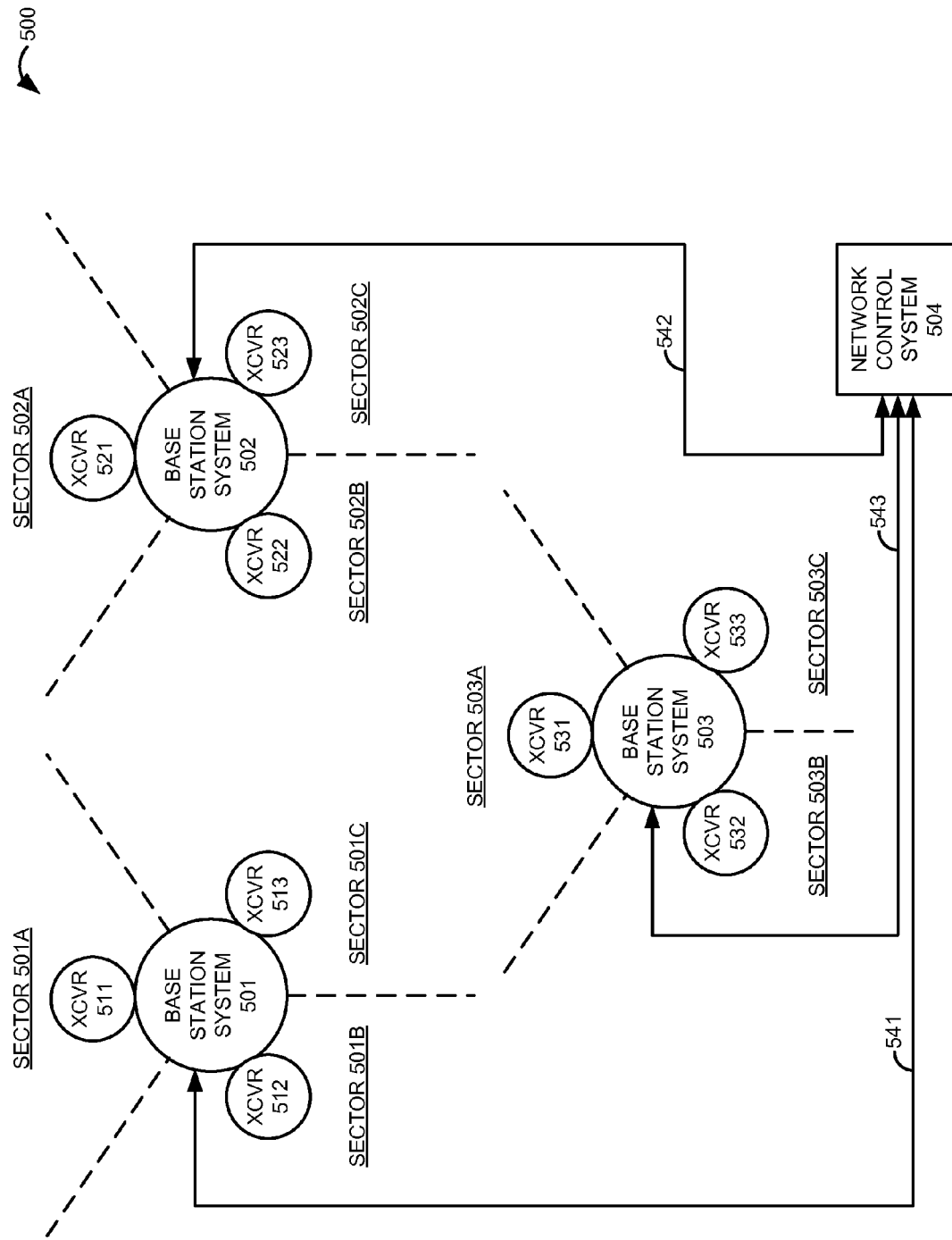
FIG. 5 illustrates a Code Division Multiplex Access (CDMA) communication system that distributes code processing.

FIG. 5 illustrates Code Division Multiple Access (CDMA) communication system 500 that distributes CDMA code processing. CDMA communication system 500 is an example of communication system 100, although system 100 may use other configurations and operations. CDMA communication system 500 comprises CDMA base station systems 501-503 and network control system 504. CDMA base station systems 501-503 and network control system 504 communicate over respective control links 541-543. CDMA base station system 501 includes CDMA transceivers 511-513 that serve respective sectors 501A, 501B, and 501C. CDMA base station system 502 includes CDMA transceivers 521-523 that serve respective sectors 502A, 502B, and 502C. CDMA base station system 503 includes CDMA transceivers 531-533 that serve respective sectors 503A, 503B, and 503C.

CDMA transceivers 511-513, 521-523, and 531-533 each use unique CDMA codes, such as public long codes, to receive session set-up requests from user communication devices (that are omitted from FIG. 5 for clarity). CDMA transceivers 511-513, 521-523, and 531-533 each measure their reverse noise levels and wirelessly broadcast corresponding reverse noise indicators. CDMA transceivers 511-513, 521-523, and 531-533 each receive and process the reverse noise indicators for proximate base stations and their own indicator to determine if they should use the CDMA code of another base station to receive session set-up requests. The user communication devices also receive and process the reverse indicators to determine if they should monitor multiple paging channels as discussed above.

Consider an example where sector 502B that is served by CDMA transceiver 522 has a reverse noise value that exceeds a first threshold. In this example, CDMA transceivers 513, 521, 523, and 531 are the potential secondary transceivers to participate in code processing distribution due to their proximity to sector 502B. These proximity-based transceiver associations are configured into base station systems 501-503 and are provided to the user communication devices.

CDMA transceivers 513, 521, 523, and 531 compare the reverse noise indicator for CDMA transceiver 522 to the first threshold and compare their own reverse noise indicator to a second threshold to determine if they should receive session requests using the code for transceiver 522. In this example, CDMA transceivers 521 and 531 have undesirable reverse noise levels and do not participate in code-processing distribution. CDMA transceivers 513 and 523 have acceptable reverse noise levels and start to use the code for transceiver 522 to receive session requests.

When user communication devices send session set-up requests using the code for transceiver 522, CDMA transceivers 513 and 523 receive some of these requests and notify network control system 504. In this example, excessive noise prevents CDMA transceiver 522 from receiving all of these session set-up requests. Network control system 504 selects and notifies individual CDMA transceivers to provide communication services to each of these requesting communication devices. The selected CDMA transceivers transfer set-up instructions to the user communication device over their own paging channels. As discussed above, the user communication devices are monitoring multiple paging channels responsive to the broadcast noise indicators. The selected CDMA transceivers then provide the communication services to the requesting user communication devices.

Note that code processing may be distributed across the transceivers in the same base station (transceivers 522-523) and/or be distributed across the transceivers in different base stations (transceivers 513 and 522).

Figure 6:
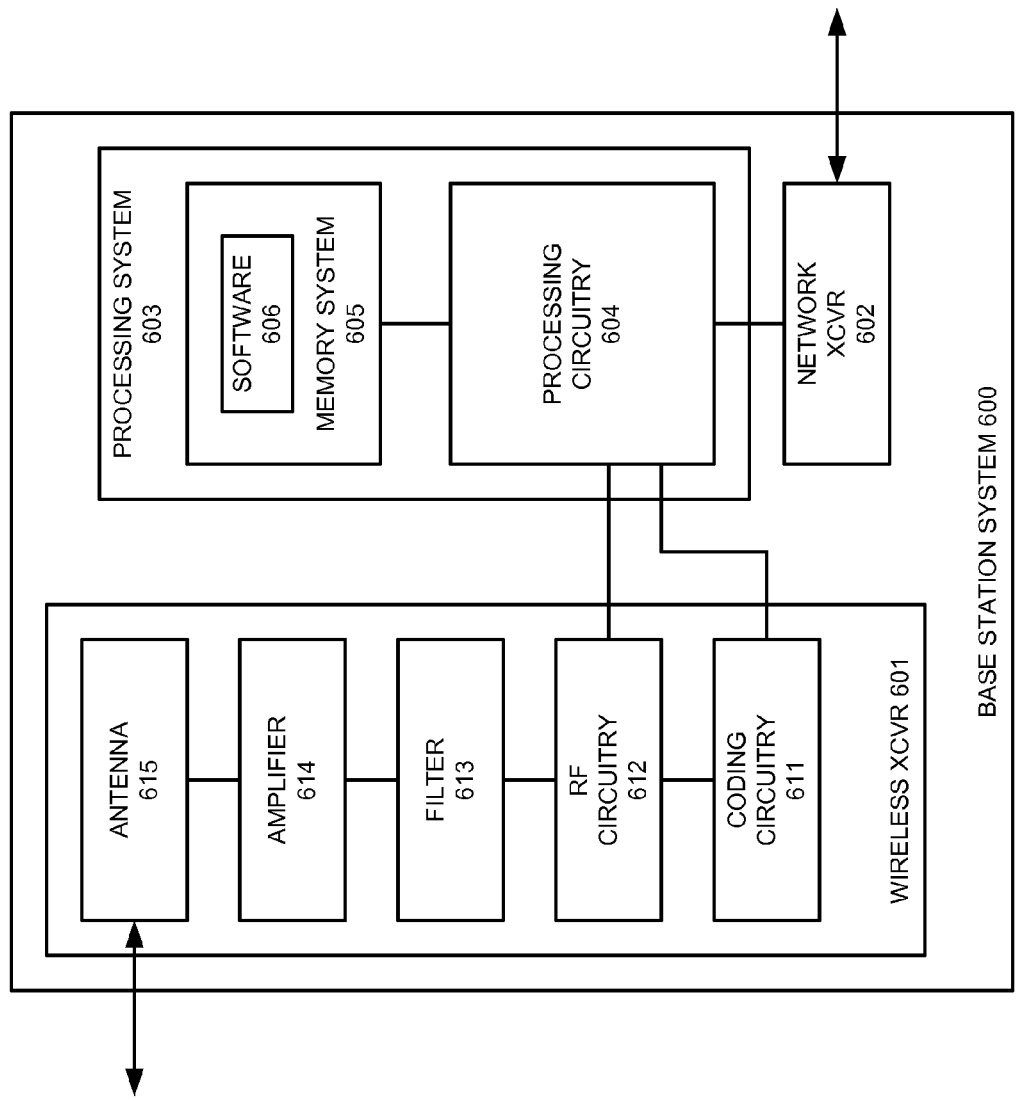
FIG. 6 illustrates a base station system to distribute code processing.

FIG. 6 illustrates base station system 600. Base station system 600 is an example of base station transceivers 101-102 and base station systems 501-503, although these transceivers and systems may use alternative configurations. Base station system 600 comprises wireless transceiver 601, network transceiver 602, and processing system 603. Processing system 603 comprises processing circuitry 604 and memory system 605 that stores operating software 606. Processing system 603 is linked to transceivers 601-602. Base station system 600 may include additional transceivers and other well-known components that are not shown for clarity, such as routers, servers, computer systems, databases, and power systems.

Wireless transceiver 601 comprises coding circuitry 611, Radio Frequency (RF) circuitry 612, filter 613, amplifier 614, and antenna 615. Coding circuitry 611 implements a CDMA format by coding and decoding user communications using short codes, long codes, and Walsh codes. In particular, coding circuitry 611 is configured to allocate processing resources to decode signals that use the CDMA codes of other transceivers—in addition to its primary task of encoding and decoding signals using its own CDMA codes. RF circuitry 612 performs modulation and demodulation across the carrier frequency band. RF circuitry 612 also measures various wireless communication performance attributes, such as reverse noise and signal-to-noise. Filter 613 attenuates undesirable signal energy outside of the carrier frequency band. Amplifier 614 boosts the energy of signals for wireless transmission and boosts the energy of received signals. Antenna 615 receives wireless signal energy over the air and propagates wireless signal energy into the air for wireless signal transmission. Wireless transceiver 601 may also include signal processing circuitry, software, and/or some other communication components.

Network transceiver 602 comprises a physical communication port, signal processing circuitry, software, and/or some other communication components. Network transceiver 602 may use various protocols, such as Internet Protocol (IP), Time Division Multiplex (TDM), Ethernet, wireless, or some other network communication format—including combinations thereof. Network transceiver 602 exchanges user communications and control data with network systems. In particular, network transceiver 602 exchanges set-up requests and instructions with a network control system as described herein for base station transceivers 101-102 and base station systems 501-503.

Processing circuitry 604 comprises microprocessor and other circuitry that retrieves and executes operating software 606 from memory system 605. Memory system 605 comprises a computer-readable storage medium, such as a disk drive, flash drive, data storage circuitry, or some other memory apparatus. Memory system 605 could be a single device or be distributed across multiple devices. Processing circuitry 604 is typically mounted on one or more circuit boards that may also hold memory system 605 and portions of communication transceivers 601-602.

Operating software 606 comprises computer programs, firmware, or some other form of computer-readable processing instructions. Operating software 606 may include an operating system, utilities, drivers, network interfaces, applications, or some other type of software. When executed by processing circuitry 604, operating software 606 directs processing system 603 to operate base station system 600 as described herein for base station transceivers 101-102 and base station systems 501-503. In particular, operating software 606 directs processing system 603 to provide code processing distribution as described herein.

Figure 7:
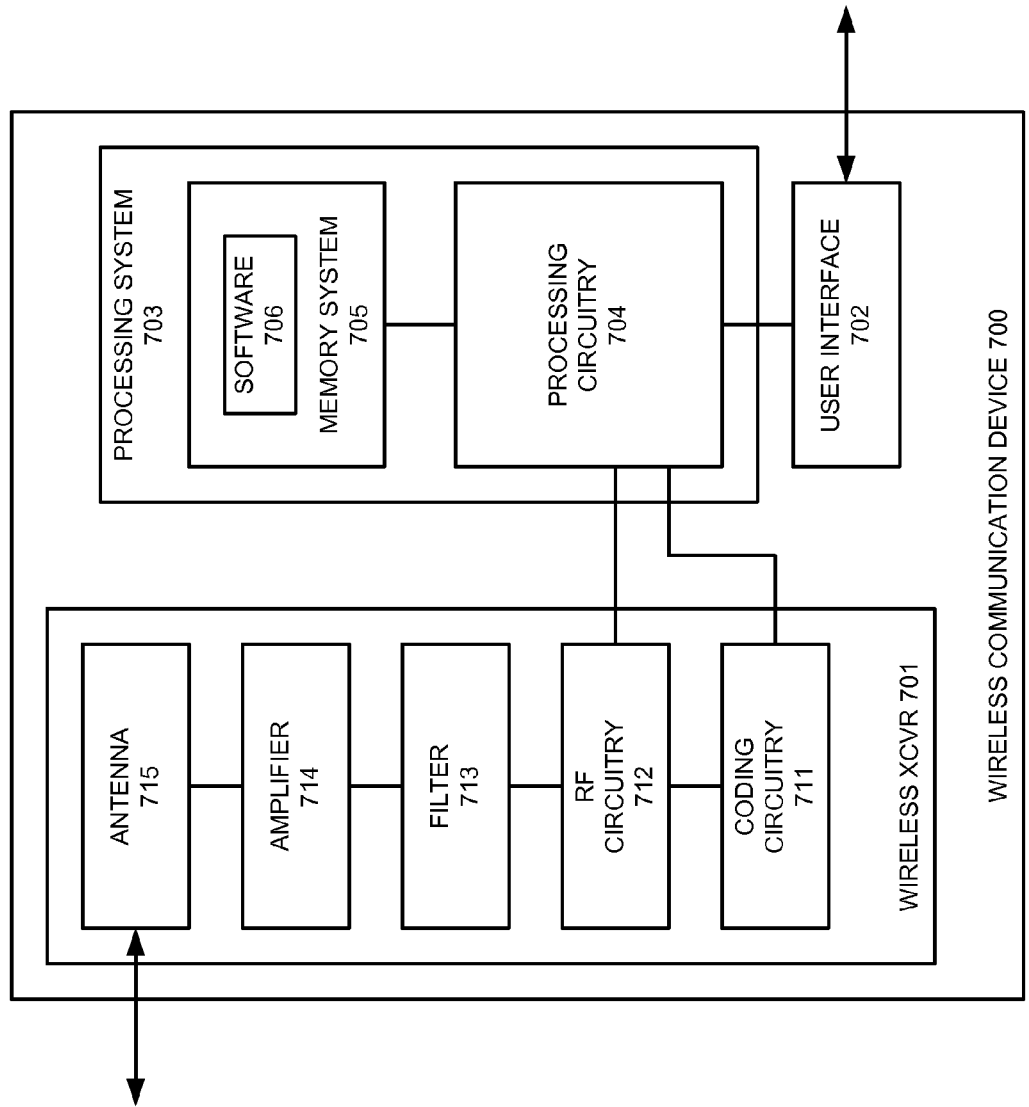
FIG. 7 illustrates a wireless communication device to distribute code processing.

FIG. 7 illustrates wireless communication device 700. Wireless communication device 700 is an example of wireless communication device 103, although device 103 may use alternative configurations. Wireless communication device 700 comprises wireless transceiver 701, user interface 702, and processing system 703. Processing system 703 comprises processing circuitry 704 and memory system 705 that stores operating software 706. Processing system 703 is linked to transceiver 701 and user interface 702. Wireless communication device 700 may include other well-known components that are not shown for clarity, such as a battery, ports, communication interfaces, enclosure, and the like.

Wireless transceiver 701 comprises coding circuitry 711, Radio Frequency (RF) circuitry 712, filter 713, amplifier 714, and antenna 715. Coding circuitry 711 implements a CDMA format by coding and decoding user communications using short codes, long codes, and Walsh codes. RF circuitry 712 performs modulation and demodulation across the carrier frequency band. Filter 713 attenuates undesirable signal energy outside of the carrier frequency band. Amplifier 714 boosts the energy of signals for wireless transmission and boosts the energy of received signals. Antenna 715 receives wireless signal energy over the air and propagates wireless signal energy into the air for wireless signal transmission. Wireless transceiver 701 may also include signal processing circuitry, software, and/or some other communication components. exchanges user communications and control data with network systems. Wireless transceiver 701 receives the broadcast noise indicators and monitors multiple paging channels as described herein for wireless communication device 103.

User interface 702 comprises components to interact with the user, such as displays, lights, buttons, microphones, switches, speakers, touch screens, and the like.

Processing circuitry 704 comprises microprocessor and other circuitry that retrieves and executes operating software 706 from memory system 705. Memory system 705 comprises a computer-readable storage medium, such as a disk drive, flash drive, data storage circuitry, or some other memory apparatus. Memory system 705 could be a single device or be distributed across multiple devices. Processing circuitry 704 is typically mounted on one or more circuit boards that may also hold memory system 705 and portions of communication transceiver 701 and user interface 702.

Operating software 706 comprises computer programs, firmware, or some other form of computer-readable processing instructions. Operating software 706 may include an operating system, utilities, drivers, network interfaces, applications, or some other type of software. When executed by processing circuitry 704, operating software 706 directs processing system 703 to operate wireless communication device 700 as described herein for wireless communication device 103. In particular, operating software 706 directs processing system 703 to process noise indicators for multiple base station transceivers to monitor multiple paging channels as described herein.

Referring back to FIGS. 1-2, base station transceivers 101-102 each comprise antennas and RF communication circuitry for wireless communication. The RF communication circuitry typically includes amplifiers, filters, RF modulators, and signal processing circuitry. The signal processing circuitry implements a code division multiplexing format. Base station transceivers 101-102 also comprise processing circuitry, memory, software, and network communication interfaces. Base station transceivers 101-102 may also include routers, servers, call processors, computer systems, communication links, and other communication network elements. Network control system 103 comprises processing circuitry, memory, software, and network communication interfaces.

Wireless communication device 103 comprises an antenna and RF communication circuitry for wireless communication. The RF communication circuitry typically includes an amplifier, filter, RF modulator, and signal processing circuitry. The signal processing circuitry implements a code division multiplexing format. Wireless communication device 103 may also comprise processing circuitry, memory, software, and a user interface.

Wireless signals 111-112, 121-122, 141-142, and 151-152 use the air or space as the transport media. These wireless signals may use various protocols that use code division multiplexing, such as CDMA, Evolution Data Only (EVDO), Worldwide Interoperability for Microwave Access (WIMAX), or some other communication format that uses code division multiplexing. Control information 132-134 uses metal, glass, air, space, or some other material as the transport media. Control information 132-134 may use various communication protocols, such as TDM, IP, Ethernet, wireless, or some other communication format—including combinations thereof. Control information 132-134 may traverse direct communication links or may traverse a combination of links, networks, systems, and devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   in a first base station transceiver, receiving first wireless signals in a code division multiplex format using a first code assigned to the first base station transceiver and determining a first noise indicator corresponding to reception of the first wireless signals;
   in a second base station transceiver, receiving second wireless signals in the code division multiplex format using a second code assigned to the second base station transceiver and determining a second noise indicator corresponding to reception of the second wireless signals;
   transferring the first noise indicator from the first base station transceiver and receiving the first noise indicator in the second base station transceiver;
   in a second base station transceiver, processing the first noise indicator and the second noise indicator to determine if the second base station transceiver should receive third wireless signals using the first code assigned to the first base station transceiver; and
   if the second base station transceiver determines that it should receive the third wireless signals using the first code, then in the second base station transceiver, receiving the third wireless signals using the first code assigned to the first base station transceiver.

2. The method of claim 1 wherein processing the first noise indicator and the second noise indicator to determine if the second base station transceiver should receive the third wireless signals using the first code comprises determining if the first noise indicator exceeds a first noise level and if the second noise indicator falls below a second noise level.

3. The method of claim 1 further comprising, in a wireless communication device, receiving and processing the first noise indicator and the second noise indicator to determine if the wireless communication device should wirelessly monitor a paging channel from the second base station transceiver, and if it should wirelessly monitor the paging channel, then in the wireless communication device, wirelessly monitoring the paging channel from the second base station transceiver.

4. The method of claim 3 wherein receiving and processing the first noise indicator and the second noise indicator to determine if the wireless communication device should wirelessly monitor the paging channel comprises determining if the first noise indicator exceeds a first noise level and if the second noise indicator falls below a second noise level.

5. The method of claim 1 further comprising, in a wireless communication device, receiving and processing the first noise indicator and the second noise indicator to determine if the wireless communication device should wirelessly monitor paging channels from both the first base station transceiver and the second base station transceiver, and if it should wirelessly monitor the paging channels, then wirelessly monitoring the paging channels from both the first base station transceiver and the second base station transceiver.

6. The method of claim 5 wherein receiving and processing the first noise indicator and the second noise indicator to determine if the wireless communication device should wirelessly monitor the paging channels comprises determining if the first noise indicator exceeds a first noise level and if the second noise indicator falls below a second noise level.

7. The method of claim 1 wherein transferring the first noise indicator from the first base station transceiver comprises wirelessly broadcasting the first noise indicator from the first base station transceiver, and further comprising, wirelessly broadcasting the second noise indicator from the second base station transceiver.

8. The method of claim 1 wherein the first base station transceiver serves a first sector from a base station system and the second base station transceiver serves a second sector from the base station system.

9. The method of claim 1 wherein the first code and the second code comprise Code Division Multiple Access public long codes.

10. The method of claim 1 wherein the first base station transceiver and the second base station transceiver serve adjacent sectors.

11. A communication system comprising:
a first base station transceiver configured to receive first wireless signals in a code division multiplex format using a first code assigned to the first base station transceiver, to determine a first noise indicator corresponding to reception of the first wireless signals, and to transfer the first noise indicator;
a second base station transceiver configured to receive second wireless signals in the code division multiplex format using a second code assigned to the second base station transceiver, to determine a second noise indicator corresponding to reception of the second wireless signals, and to receive the first noise indicator;
the second base station transceiver further configured to process the first noise indicator and the second noise indicator to determine if the second base station transceiver should receive third wireless signals using the first code assigned to the first base station transceiver, and to receive the third wireless signals using the first code assigned to the first base station transceiver.

12. The communication system of claim 11 the second base station transceiver is configured to determine if the first noise indicator exceeds a first noise level and if the second noise indicator falls below a second noise level.

13. The communication system of claim 11 further comprising a wireless communication device configured to receive and process the first noise indicator and the second noise indicator to determine if the wireless communication device should wirelessly monitor a paging channel from the second base station transceiver, and to wirelessly monitor the paging channel from the second base station transceiver.

14. The communication system of claim 13 the wireless communication device is configured to determine if the first noise indicator exceeds a first noise level and if the second noise indicator falls below a second noise level.

15. The communication system of claim 11 further comprising a wireless communication device configured to receive and process the first noise indicator and the second noise indicator to determine if the wireless communication device should wirelessly monitor paging channels from both the first base station transceiver and the second base station transceiver, and to wirelessly monitor the paging channels from both the first base station transceiver and the second base station transceiver.

16. The communication system of claim 15 the wireless communication device is configured to determine if the first noise indicator exceeds a first noise level and if the second noise indicator falls below a second noise level.

17. The communication system of claim 11 wherein the first base station transceiver is configured to wirelessly broadcast the first noise indicator, and the second base station transceiver is configured to wirelessly broadcast the second noise indicator.

18. The communication system of claim 11 wherein the first base station transceiver serves a first sector from a base station system and the second base station transceiver serves a second sector from the base station system.

19. The communication system of claim 11 wherein the first code and the second code comprise Code Division Multiple Access public long codes.

20. The communication system of claim 11 wherein the first base station transceiver and the second base station transceiver serve adjacent sectors.

* * * * *